(12) United States Patent
Duan (10) Patent No.: US 12,523,845 B2
(45) Date of Patent: Jan. 13, 2026

(54) CAMERA MODULE AND ELECTRONIC DEVICE

(71) Applicant: VIVO MOBILE COMMUNICATION CO., LTD., Dongguan (CN)

(72) Inventor: Junjie Duan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 291 days.

(21) Appl. No.: 18/233,880

(22) Filed: Aug. 14, 2023

(65) Prior Publication Data

US 2023/0384557 A1 Nov. 30, 2023

Related U.S. Application Data

(63) Continuation of application No. PCT/CN2021/143800, filed on Dec. 31, 2021.

(30) Foreign Application Priority Data

Feb. 20, 2021 (CN) .......................... 202110192830.9

(51) Int. Cl.
*G02B 7/28* (2021.01)
*G01S 17/08* (2006.01)
(Continued)

(52) U.S. Cl.
CPC .............. *G02B 7/287* (2013.01); *G01S 17/08* (2013.01); *G03B 17/17* (2013.01); *H04N 23/51* (2023.01); *H04N 23/55* (2023.01)

(58) Field of Classification Search
CPC ........ G01S 17/08; G01S 17/86; G01S 7/4814; G01S 7/4816; G02B 7/287; G03B 17/17; H04N 23/51; H04N 23/55
See application file for complete search history.

(56) References Cited

U.S. PATENT DOCUMENTS

2012/0013886 A1* 1/2012 Park .................... G01S 17/86
356/4.01
2015/0323669 A1* 11/2015 Lee ..................... G01S 7/4813
356/3.11
(Continued)

FOREIGN PATENT DOCUMENTS

CN 207820069 U 9/2018
CN 109068033 A 12/2018
(Continued)

OTHER PUBLICATIONS

International Search Report issued in corresponding International Application No. PCT/CN2021/143800, mailed Mar. 21, 2022, 4 pages.
(Continued)

*Primary Examiner* — Amy R Hsu
(74) *Attorney, Agent, or Firm* — IPX PLLC (57) ABSTRACT

A camera module and an electronic device are provided. The camera module includes a reflective member provided with a reflective and transmissive surface; a lens assembly and an image sensor, provided on a side of the reflective member; a filter reflection layer, provided on the reflective and transmissive surface; and a laser sensor, provided on a side of the reflective and transmissive surface facing away from an entrance surface. The filter reflection layer is capable of reflecting light of a first frequency band and transmitting light of a second frequency band. The first frequency band and the second frequency band are independent of each other.

16 Claims, 9 Drawing Sheets

(51) Int. Cl.
    *G03B 17/17*     (2021.01)
    *H04N 23/51*     (2023.01)
    *H04N 23/55*     (2023.01)

(56) References Cited

U.S. PATENT DOCUMENTS

| | | | | |
|---|---|---|---|---|
| 2017/0045616 | A1* | 2/2017 | Masuda | H04N 23/71 |
| 2020/0011995 | A1* | 1/2020 | Send | G01S 3/783 |
| 2020/0088859 | A1* | 3/2020 | Shepard | G01S 17/42 |
| 2021/0239801 | A1* | 8/2021 | Liu | G01S 7/4816 |

FOREIGN PATENT DOCUMENTS

| | | |
|---|---|---|
| CN | 111024626 A | 4/2020 |
| CN | 112311969 A | 2/2021 |
| CN | 113014764 A | 6/2021 |
| JP | 2002207163 A | 7/2002 |

OTHER PUBLICATIONS

First Office Action issued in related Chinese Application No. 202110192830.9, mailed Jul. 11, 2022, 4 pages.
Second Office Action issued in related Chinese Application No. 202110192830.9, mailed Dec. 12, 2022, 4 pages.

\* cited by examiner

CAMERA MODULE AND ELECTRONIC DEVICE

CROSS-REFERENCE TO RELATED APPLICATIONS

This application is a continuation of International Application No. PCT/CN2021/143800, filed on Dec. 31, 2021, which claims priority to Chinese Patent Application No. 202110192830.9 filed on Feb. 20, 2021. The entire contents of each of the above-referenced applications are expressly incorporated herein by reference.

TECHNICAL FIELD

This application pertains to the field of electronic device technologies, and specifically relates to a camera module and an electronic device.

BACKGROUND

Figure 1:
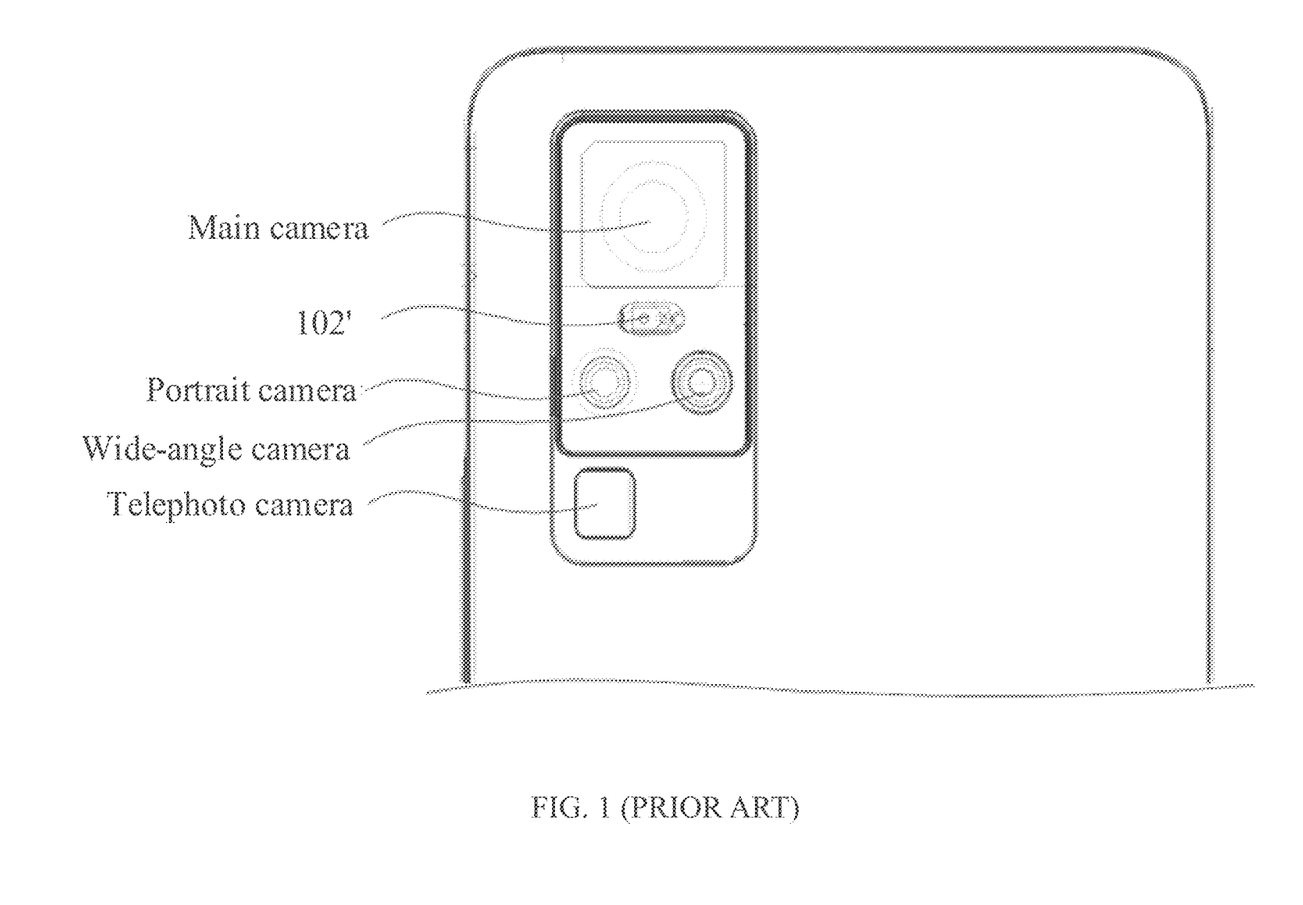
FIG. 1 is a schematic structural diagram of a camera and laser sensor in the prior art.
Figure 2:
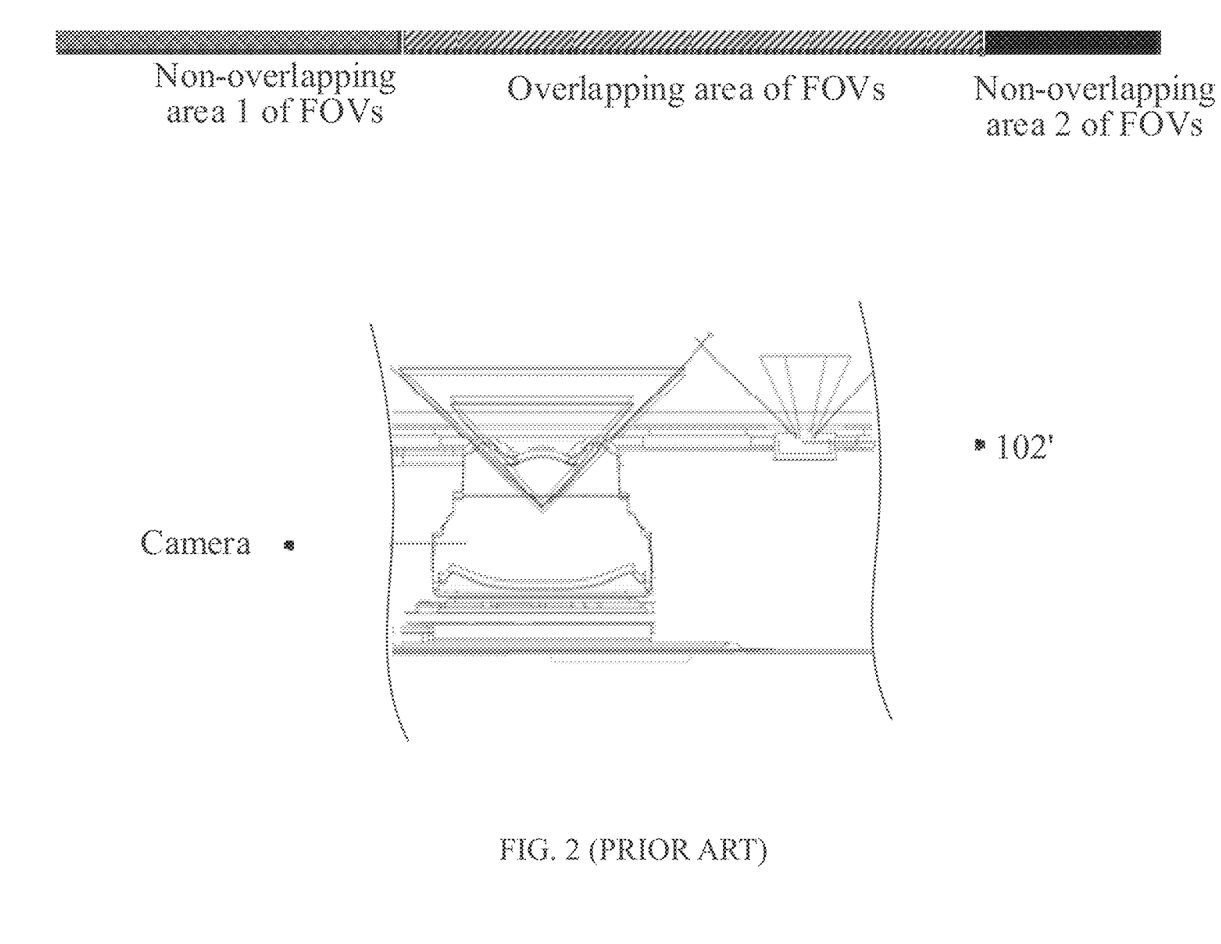
FIG. 2 is a schematic structural diagram of a field of view in the prior art.

With the continuous development of the shooting function of mobile phones, the number of cameras is increasing. As each camera has an auto-focus function, an individual distance sensor is configured to measure the distance to the shot object. As shown in FIG. 1, existing distance sensors occupy limited space in the mobile phone and their optical axes are not aligned with the optical axes of the camera, making it impossible to accurately calculate the focus point. In some special angles, as shown in FIG. 2, there are two non-overlapping areas where the laser sensor cannot be used to assist the camera to focus, which greatly affects user experience.

SUMMARY

This application aims to provide a camera module and an electronic device.

This application is implemented as follows:

According to a first aspect, embodiments of this application propose a camera module, including: a reflective member, the reflective member being provided with a reflective and transmissive surface; a lens assembly and an image sensor, provided on a side of the reflective member, where light directed outwardly through the exit surface is directed to the image sensor through the lens assembly; a filter reflection layer provided on the reflective and transmissive surface, where the filter reflection layer is capable of reflecting light of a first frequency band and transmitting light of a second frequency band; and a laser sensor, provided on a side of the reflective and transmissive surface facing away from the entrance surface, where projection of the filter reflection layer on an installation surface of the laser sensor overlaps with at least a part of the laser sensor. The laser sensor determines a distance based on the light of the second frequency band transmitted through the filter reflection layer, and the lens assembly adjusts a focus based on the distance. The first frequency band and the second frequency band are independent of each other.

The camera module according to the embodiments of this application includes the reflective member, the lens assembly and image sensor provided on a side of the reflective member, the filter reflection layer provided on a reflective and transmissive surface, and the laser sensor provided on the side of the reflective and transmissive surface facing away from an entrance surface. Both the laser sensor and the image sensor can receive external light through a light path of the reflective member, an overlapping angle of the fields of view of the laser sensor and the image sensor is relatively large. This means that an overlapping degree of the fields of view of the photosensitive units in the laser sensor and the image sensor is improved, thereby increasing focusing accuracy, making it more convenient for users to focus when using the camera module for shooting.

For example, a prism includes three surfaces: the entrance surface, the reflective and transmissive surface, and the exit surface. When light propagates inside the prism, it mainly enters through the entrance surface, is reflected by the reflective and transmissive surface, and is directed outwardly through the exit surface. It can be understood that by using the prism, the direction of light propagation can be changed, and when the size in a specific direction is limited, the light path can be made complete in another direction by changing the direction of the light path. This is particularly useful for periscope cameras as the prism allows for adjusting the focal range as required. In addition, a lens assembly and an image sensor are provided on a side of the prism, and light emitted outwardly through the exit surface is mainly directed towards the image sensor for receiving the light and realizing imaging.

It should be emphasized that this application is mainly implemented by adding the filter reflection layer and the laser sensor. The filter reflection layer is directly provided on the reflective and transmissive surface. Under the action of the filter reflection layer, the light of the first frequency band can be reflected, while filtering is performed for the light of the second frequency band. It should be noted that the filtering for the light of the second frequency band ensures that only the light of the second frequency band can pass through the filter reflection layer, and the light of other frequency bands can be filtered out.

Furthermore, the laser sensor is provided on the side of the reflective and transmissive surface facing away from the entrance surface, and the filter reflection layer covers the laser sensor on the installation surface of the laser sensor, that is, projection of the filter reflection layer overlaps with at least a part of the laser sensor, so that light emitted outwardly from the laser sensor is allowed to enter the prism through the filter reflection minor structure, thereby improving the overlapping degree of the fields of view of the photosensitive units in the laser sensor and the image sensor, and reducing the focus shift. During the operation of the camera module, the laser sensor can determine a distance based on the light of the second frequency band, and the lens assembly can perform focus adjustment based on the distance.

The first and second frequency bands are independent of each other, that is, there is no overlap between the first and second frequency bands.

It should be understood by those skilled in the art that at the beginning of the focusing process, the laser sensor emits light of a specific frequency band, including but not limited to an infrared laser beam. The timing starts at this point, and when the light reflected back from the photographed object or obstacle is received by the laser sensor, the timing stops. By calculating the speed of light and time, the distance between the camera module and the obstacle can be obtained. This distance can be sent to the focus controller in the camera module to control the focusing motor to move to the focusing plane for achieving focus.

According to a second aspect, embodiments of this application propose an electronic device including: a main body; and the camera module in the above embodiments, where the camera module is provided on the main body and functions as a front camera module and/or a rear camera module for the electronic device.

The electronic device provided according to the embodiments of this application includes the main body and the camera module according to any one of the above embodiments. By the provision of the camera module on the main body, the images captured by the camera module can be sent to the main body for further post-processing and sharing. The camera module can function as a front module or rear module, thereby enabling the front or rear camera of the electronic device to have an anti-shake capability, or both the front and rear cameras have the anti-shake capability according to any one of the above embodiments.

Since the electronic device includes the camera module of any one of the above embodiments, it has the effect of the camera module of any one of the above embodiments, which will not be described again.

It is worth stating that the types of electronic devices are diverse, such as mobile phones, tablets, e-readers, and other devices that require a camera module.

For additional aspects and advantages of this application, some will be given in the following description, and some will become apparent in the following description or will be understood in the practice of this application.

BRIEF DESCRIPTION OF DRAWINGS

The above and/or additional aspects and advantages of this application will become obvious and easy to understand from the description of the embodiments with reference to the following drawings.

DETAILED DESCRIPTION

Embodiments of this application are described in detail below. Examples of the embodiments are shown in the accompanying drawings, and the same or similar reference signs indicate the same or similar components or components with the same or similar functions throughout the drawings. The embodiments described below with reference to the drawings are illustrative and merely for explaining this application. They should not be construed as limitations on this application. All other embodiments obtained by persons of ordinary skill in the art based on the embodiments of this application without creative efforts shall fall within the protection scope of this application.

A feature modified by the term "first", "second", or the like in the specification and claims of this application can explicitly or implicitly include one or more such features. In the descriptions of this application, "a plurality of" means at least two unless otherwise stated. In addition, "and/or" in the specification and claims represents at least one of connected objects, and the character "/" generally indicates that the contextually associated objects have an "or" relationship.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for the ease and brevity of description of the embodiments of this application rather than indicating or implying that the apparatuses or components mentioned must have specific orientations or must be constructed or manipulated according to specific orientations, and therefore shall not be construed as any limitations on the embodiments of this application.

In the description of this application, it should be noted that unless otherwise specified and defined explicitly, the terms "mount", "connect", "join", and "attach" should be understood in their general senses. For example, they may refer to a fixed connection, a detachable connection, or an integral connection; a mechanical connection or an electrical connection; and a direct connection, an indirect connection via an intermediate medium, or an internal communication between two elements. Persons of ordinary skill in the art can understand specific meanings of these terms in this application as appropriate to specific situations.

The camera module and electronic device according to embodiments of this application are described below with reference to FIGS. 3 to 9.

Figure 3:
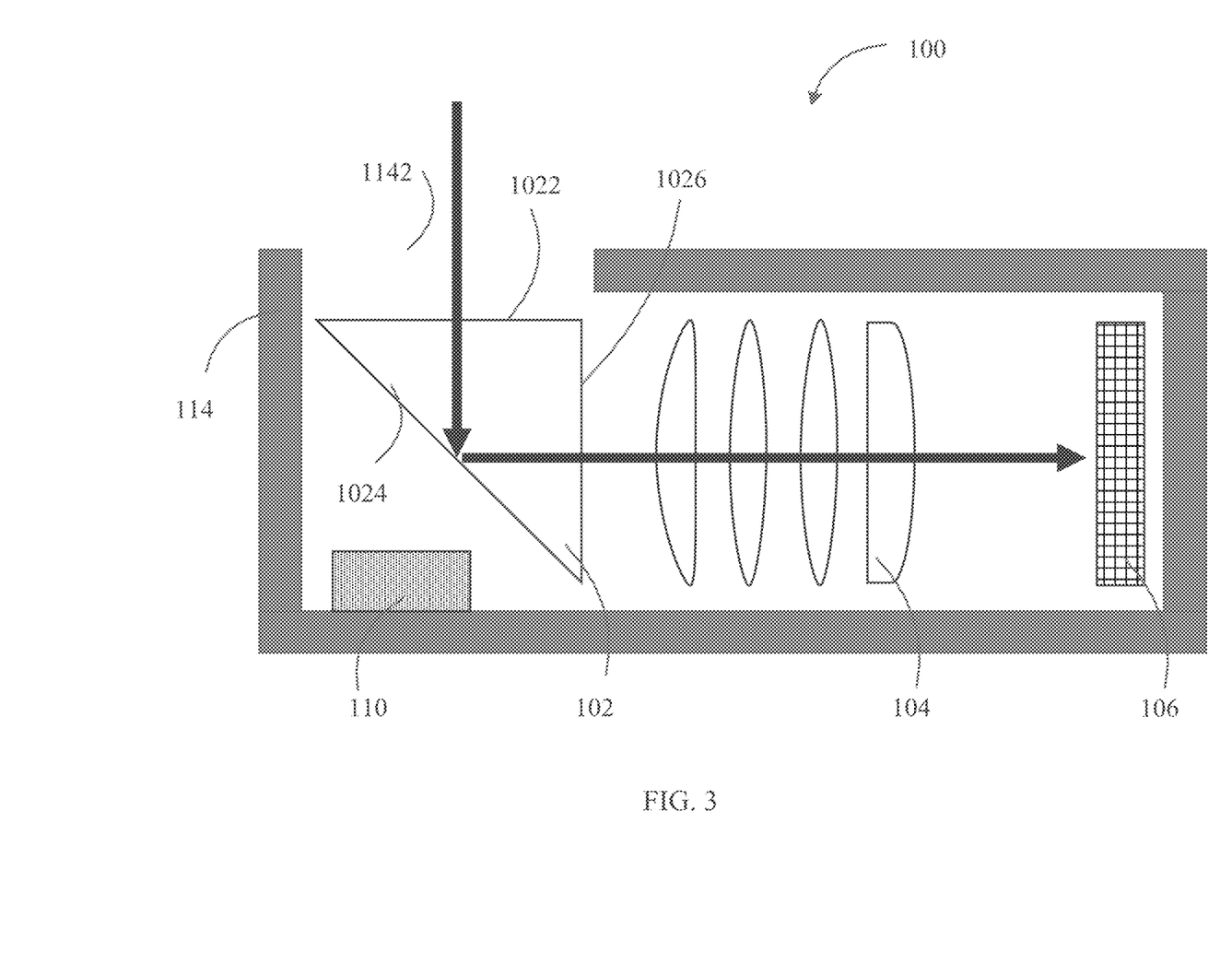
FIG. 3 is a schematic structural diagram of a camera module according to an embodiment of this application.
Figure 4:
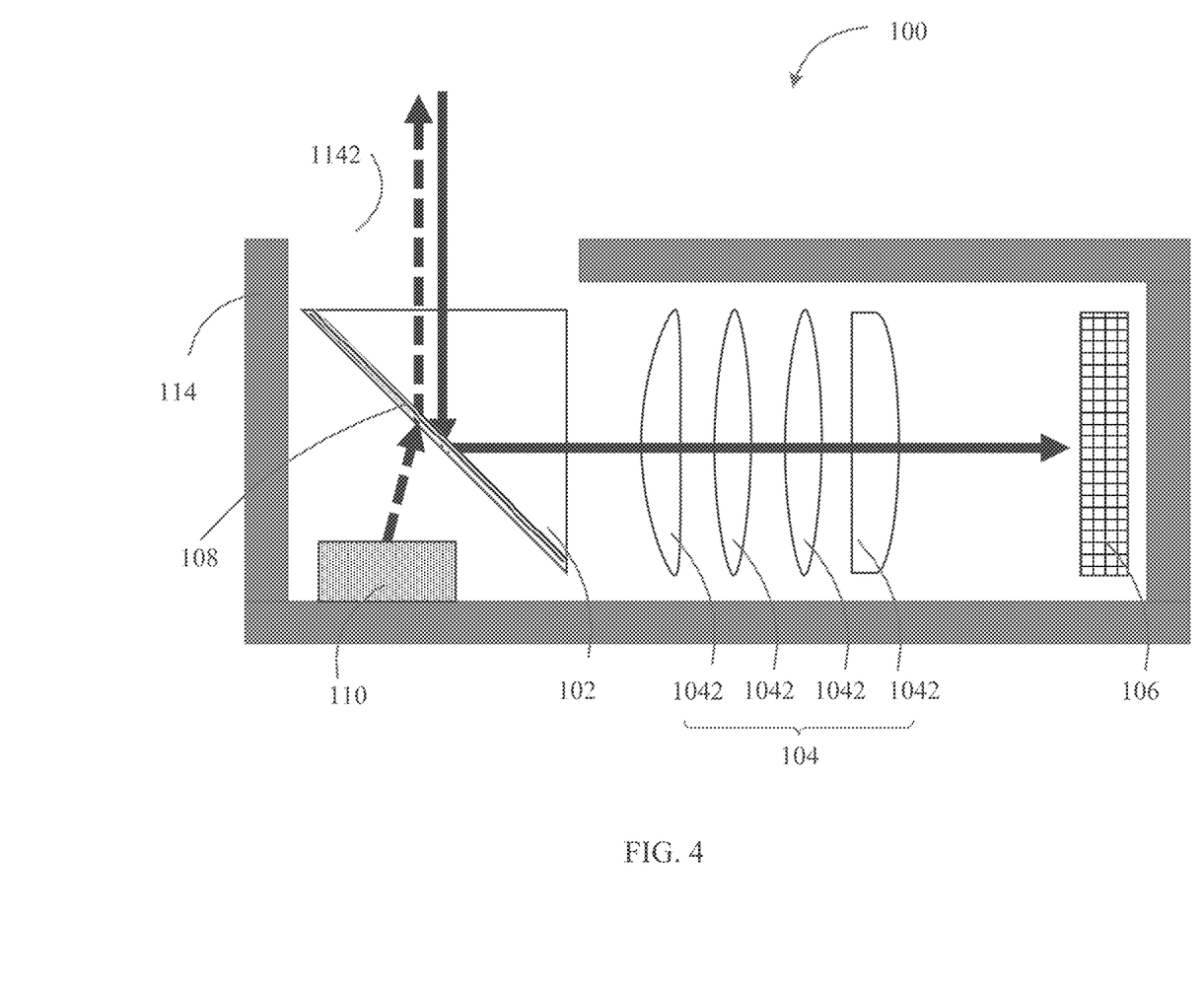
FIG. 4 is a schematic structural diagram of a camera module according to an embodiment of this application.

As shown in FIGS. 3 and 4, this application provides embodiments of a camera module 100 including: a reflective member provided with a reflective and transmissive surface; a lens assembly 104 and an image sensor 106, provided on a side of the reflective member 102, where light emitted outwardly through the exit surface 1026 is directed to the image sensor 106 through the lens assembly 104; a filter reflection layer 108 provided on the reflective and transmissive surface 1024 and capable of reflecting light of a first frequency band and transmitting light of a second frequency band; and a laser sensor 110, provided on a side of the reflective and transmissive surface 1024 facing away from the entrance surface 1022. Projection of the filter reflection layer 108 covers the laser sensor 110 on the installation surface of the laser sensor 110. The first frequency band and the second frequency band are independent of each other.

The camera module 100 according to the embodiments of this application includes the reflective member 102, the lens assembly 104 and image sensor 106 provided on a side of the reflective member 102, the filter reflection layer 108 provided on the reflective and transmissive surface 1024, and the laser sensor 110 provided on the side of the reflective and transmissive surface 1024 facing away from the entrance surface 1022. Both the laser sensor 110 and the image sensor 106 can receive external light through a light path of the reflective member 102, an overlapping angle of their fields of view is relatively large. This means that an overlapping degree of the fields of view of the photosensitive units in the laser sensor 110 and the image sensor 106 is improved, thereby increasing focusing accuracy, making it more convenient for users to focus when using the camera module 100 for shooting. During the operation of the camera module, the laser sensor can determine a distance based on the light of the second frequency band, and the lens assembly can perform focus adjustment based on the distance.

For example, the reflective member 102 may be a prism including three surfaces: the entrance surface 1022, the reflective and transmissive surface 1024, and the exit surface 1026. When light propagates inside the reflective member 102, it mainly enters through the entrance surface 1022, is reflected by the reflective and transmissive surface 1024, and is directed outwardly through the exit surface 1026. It can be understood that by the provision of the reflective member 102, the direction of light propagation can be changed, and when the size in a specific direction is limited, the light path can be made complete in another direction by changing the direction of the light path. This is particularly useful for periscope cameras as the reflective member 102 allows for adjusting the focal range as required. In addition, the lens assembly 104 and the image sensor 106 are provided on a side of the reflective member 102, and light emitted outwardly through the exit surface 1026 is mainly directed towards the image sensor 106 for receiving the light and realizing imaging.

It should be emphasized that this application is mainly implemented by adding the filter reflection layer 108 and the laser sensor 110, and the filter reflection layer 108 is directly provided on the reflective and transmissive surface 1024. Under action of the filter reflection layer 108, the light of the first frequency band can be reflected, while filtering is performed for the light of the second frequency band. It should be noted that the filtering for the light of the second frequency band ensures that only the light of the second frequency band can pass through the filter reflection layer 108, and the light of other frequency bands can be filtered out.

In addition, the laser sensor 110 is provided on the side of the reflective and transmissive surface 1024 facing away from the entrance surface 1022, and the filter reflection layer 108 covers the laser sensor 110 on the installation surface of the laser sensor 110, so that light emitted from the laser sensor 110 is allowed to enter the reflective member 102 through the filter reflection mirror structure, which helps to improve the overlapping degree of the fields of view of the photosensitive units in the laser sensor 110 and the image sensor 106, and therefore reduces the focusing shift.

For this embodiment, the camera module 100 can capture images normally like an original periscope-style telephoto camera, as the filter reflection layer 108 does not alter the visible light reflection characteristics of the periscope reflective member 102. Additionally, laser ranging is achieved to assist camera focusing. This is because under the action of the filter reflection layer 108, the infrared light emitted by the laser sensor 110 can pass through normally and the infrared laser-based laser sensor 110 is not obstructed by the corners of the camera. Meanwhile, since both the image sensor and the laser sensor 110 use the light path of the reflective member 102 to receive external light, their FOVs (that is, field of view) overlap.

The first and second frequency bands are independent of each other, that is, there is no overlap between the first and second frequency bands.

It should be understood by those skilled in the art that at the beginning of the focusing process, the laser sensor 110 emits light of a specific frequency band, including but not limited to an infrared laser beam. The timing starts at this point, and when the light reflected back from the photographed object or obstacle is received by the laser sensor 110, the timing stops. By calculating the speed of light and time, the distance between the camera module 100 and the obstacle can be obtained. This distance can be sent to the focus controller in the camera module 100 to control the focusing motor to move to the focusing plane for achieving focus.

Figure 7:
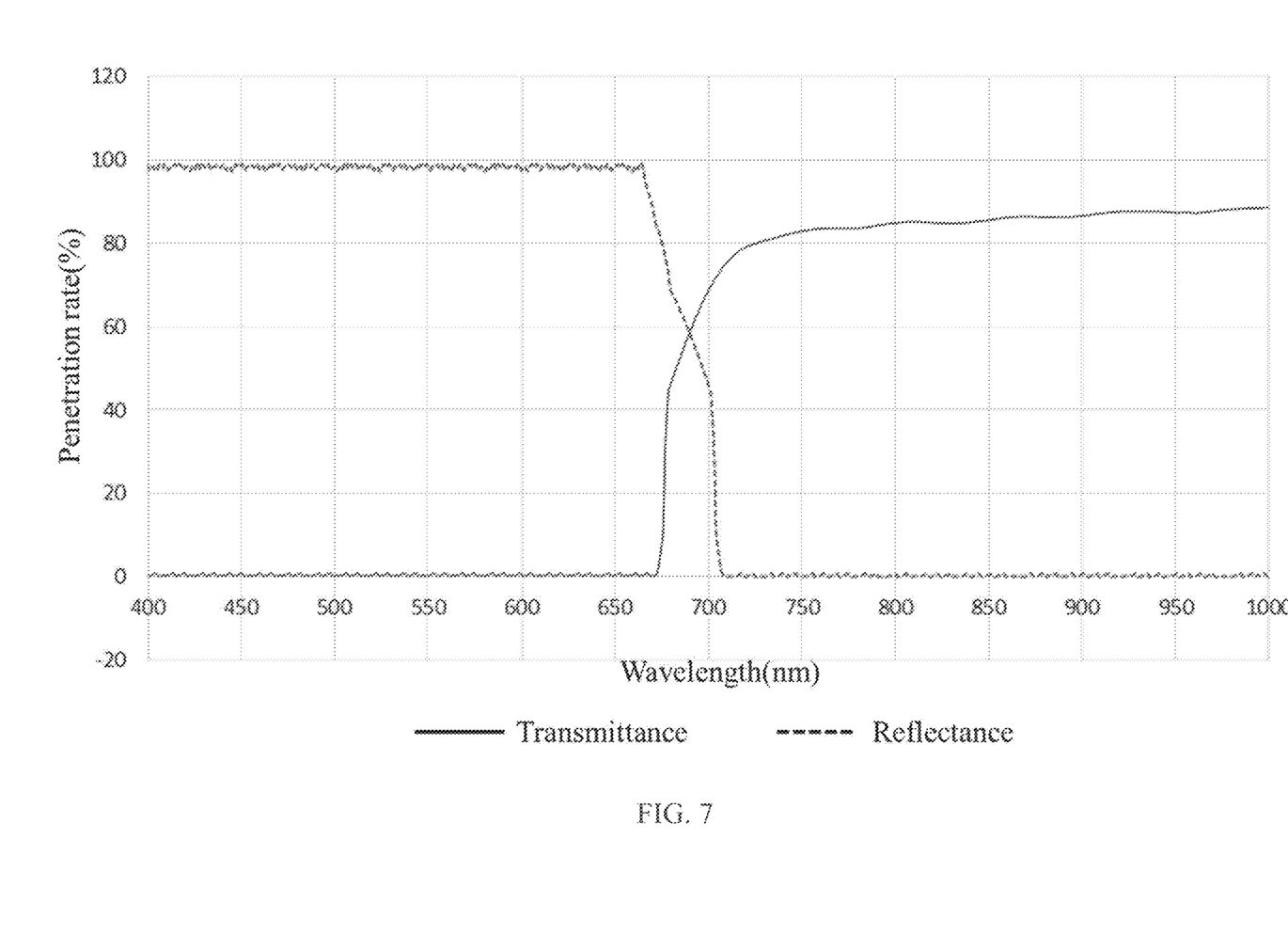
FIG. 7 is a spectral response diagram of a filter reflection layer according to an embodiment of this application.

In one embodiment, the transmittance and reflectance curves of the filter reflection layer are shown in FIG. 7, which shows that the first frequency band is the visible light band and the second frequency band is the infrared light frequency band.

By the limiting of the first frequency band to the visible light frequency band and the second frequency band to the infrared light frequency band, under the action of the filter reflection layer 108, visible light is reflected and infrared light is transmitted. This meets the detection requirements of the laser sensor 110 for infrared light and also meets the imaging requirements of the image sensor due to the complete reflection of visible light.

It should be understood by those skilled in the art that the visible light frequency band is 380 nm to 700 nm and the infrared light frequency band is 760 nm to 1 mm.

Figure 6:
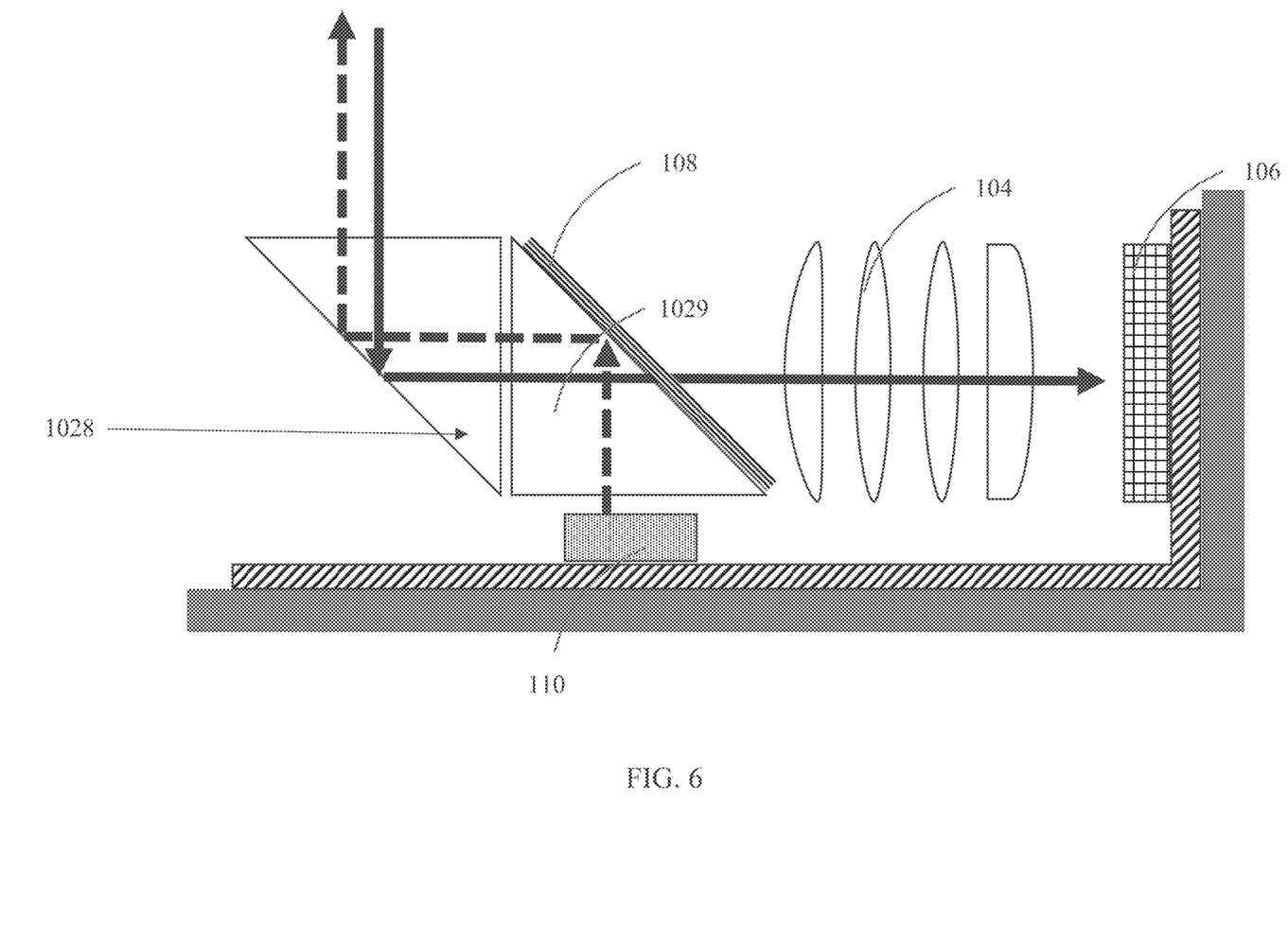
FIG. 6 is a schematic structural diagram of a camera module according to an embodiment of this application.
Figure 8:
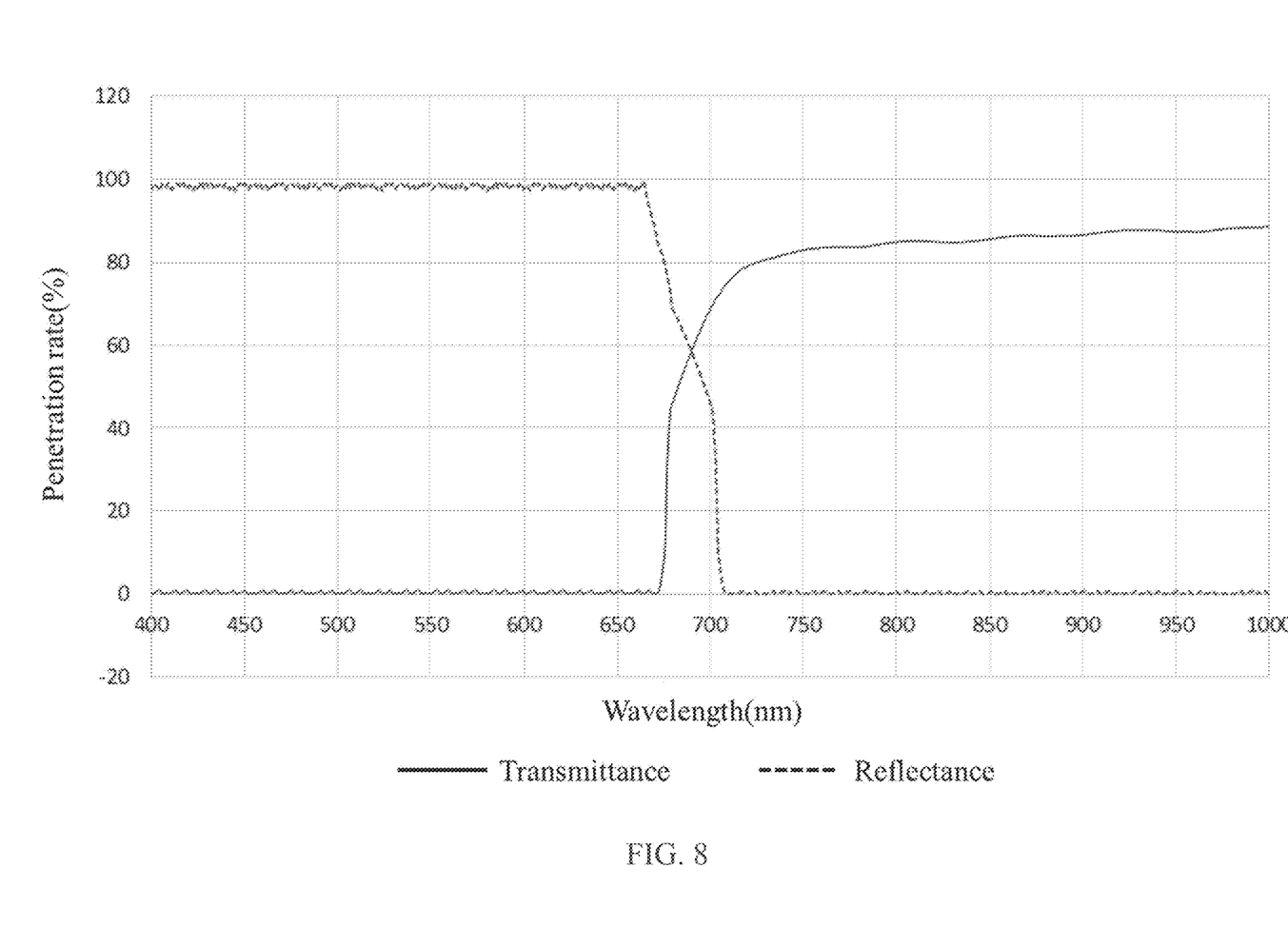
FIG. 8 is a spectral response diagram of a filter reflection layer according to another embodiment of this application.

As shown in FIG. 6, the transmittance and reflectance curves of the filter reflection layer are shown in FIG. 8, the first frequency band is the infrared light frequency band, and the second frequency band is the visible light frequency band. The reflective member 102 includes a first lens body 1028 and a second lens body 1029. The exit surface 1026 of the first lens body 1028 is opposite to the entrance surface 1022 of the second lens body 1029, and the filter reflection layer 108 is provided on the reflective and transmissive surface 1024 of the second lens body 1029. The external light enters the second lens body 1029 through the entrance surface 1022, the reflective and transmissive surface 1024, and the exit surface 1026 of the first lens body 1028, then reaches the image sensor 106 through the entrance surface 1022, the reflective and transmissive surface 1024, the filter reflection layer 108 of the second lens body 1029. The ranging light enters the first lens body 1028 through the exit surface 1026, the reflective and transmissive surface 1024, the filter reflection layer 108, and the entrance surface 1022 of the second lens body 1029, passes through the exit surface 1026, the reflective and transmissive surface 1024, and the entrance surface 1022 of the first lens body 1028, and is directed outwardly.

In another embodiment, by the limiting of the first frequency band to the infrared light frequency band and the second frequency band to the visible light frequency band, under the action of the filter reflection layer 108, visible light is transmitted and infrared light is reflected. In this case, the reflective member 102 includes two lens bodies, where an exit surface 1026 of one lens body is provided opposite to an entrance surface 1022 of the other lens body. The filter reflection layer 108 is provided on the reflective and transmissive surface 1024 of the second lens body 1029. When light propagates, it passes through the two lens bodies and is directed to the image sensor and the laser sensor 110. The filter reflection layer 108 allows visible light to pass and reflects infrared light. Therefore, under the action of the filter reflection layer 108, when the light passes through the exit surface 1026 of the first lens body 1028 and is directed to the reflective and transmissive surface 1024 of the second lens body 1029 through the entrance surface 1022 of the second lens body 1029, if it is ranging light, the infrared light is reflected to the laser sensor 110, and the normal visible light passes through the reflective and transmissive surface 1024 and is directed to the image sensor.

Furthermore, external light is visible light, and it propagates in a path through the entrance surface 1022, reflective and transmissive surface 1024, and exit surface 1026 of the first lens body 1028, then into the second lens body 1029. The external light then passes through the entrance surface 1022, reflective and transmissive surface 1024, and filter reflection layer 108 of the second lens body 1029, and is directed towards the image sensor 106. On the other hand, ranging light is infrared light, and it propagates in a path through the exit surface 1026, reflective and transmissive surface 1024, filter reflection layer 108, and entrance surface 1022 of the second lens body 1029 and then into the first lens body 1028. The ranging light then passes through the exit surface 1026, reflective and transmissive surface 1024, and entrance surface 1022 of the first lens body 1028, and is directed outwardly.

The filter reflection layer 108 may be either a dichroic filter or an interference filter optical coating.

In one embodiment, the filter reflection layer 108 is a dichroic filter. A mature dichroic filter is used, which is bonded to the reflective and transmissive surface 1024 of the reflective member 102 using optical glue. This manufacturing process is relatively simple.

In another embodiment, an interference filter optical coating is used to achieve dichroic mirrors. Using the multi-layer interference filter technology, it is possible to achieve visible light reflection and infrared light transmission characteristics similar to those of dichroic mirrors. This implementation has higher integration compared to the scheme with direct use of filters.

Figure 5:
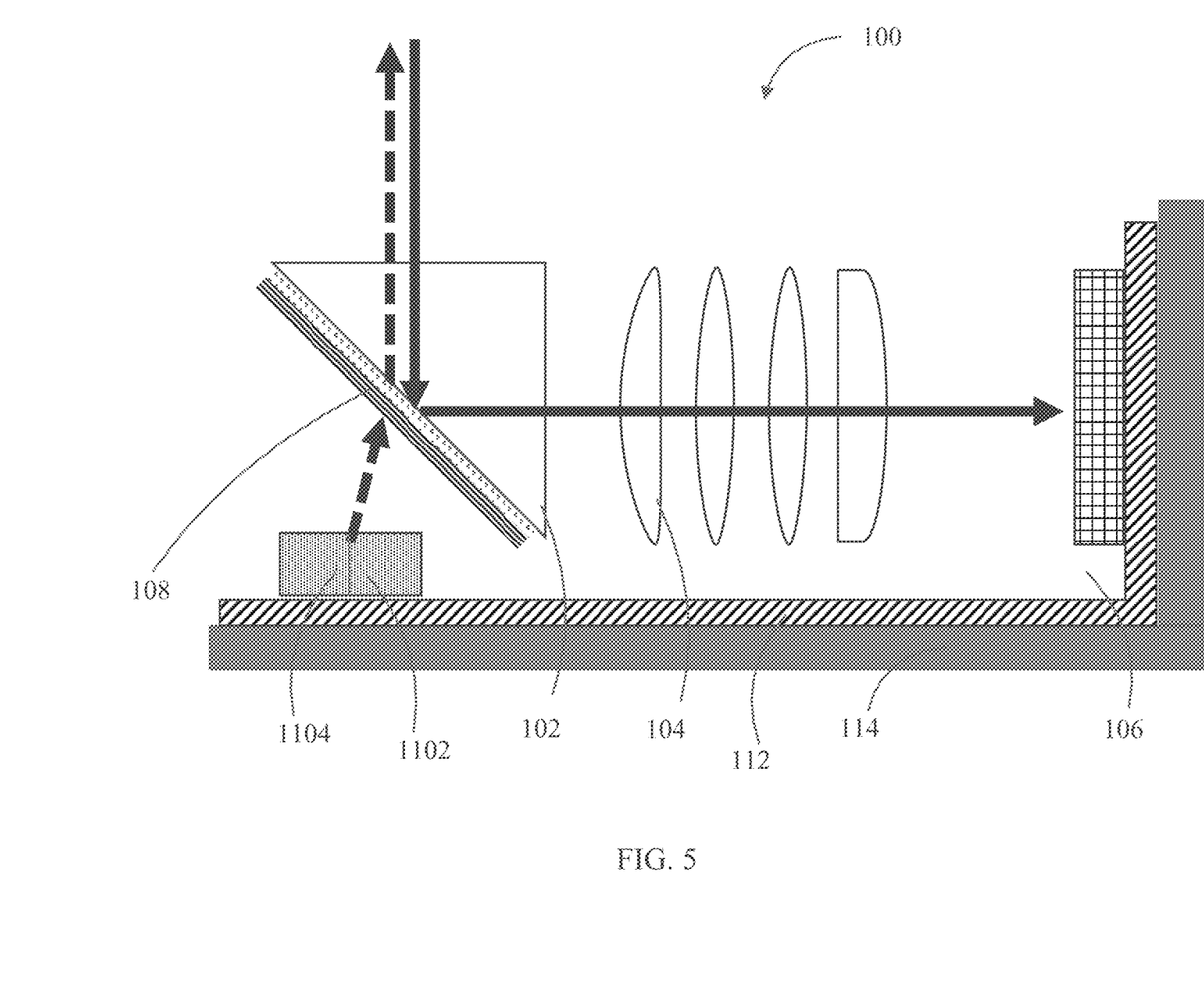
FIG. 5 is a schematic structural diagram of a camera module according to an embodiment of this application.

As shown in FIG. 5, the laser sensor 110 includes: a signal emitter 1102, which emits ranging light outwardly, where the ranging light is then transmitted outwardly through the filter reflection layer 108 and the reflective member 102; and a signal receiver 1104, which receives the ranging light reflected by the obstacle into the signal receiver 1104.

The laser sensor 110 mainly includes the signal emitter 1102 and the signal receiver 1104. The signal emitter 1102 can emit ranging light outwardly to facilitate the emission of specific frequency bands of light, including but not limited to infrared laser beams, at the start of the focusing process. The ranging light passes through the filter reflection layer 108 and the reflective member 102 in sequence and is emitted outwardly, and timing starts at this point. When the signal receiver 1104 receives the ranging light reflected back by the shot object or obstacle, the timing stops. By calculating the speed of light and time, the distance between the camera module 100 and the obstacle can be obtained. This distance can be sent to the focus controller in the camera module 100 to control the focusing motor to move to the focusing plane for achieving focus.

Furthermore, a housing 114 is included. The reflective member 102, the lens assembly 104, the image sensor 106, the filter reflection layer 108, and the laser sensor 110 are all provided within the housing 114, and an entrance hole 1142 corresponding to the reflective member 102 is provided on a wall of the housing 114, allowing external light to enter the reflective member 102 through the entrance hole 1142.

The camera module 100 includes the housing 114 that accommodates other components. For example, the housing 114 can accommodate the reflective member 102, lens assembly 104, image sensor 106, filter reflection layer 108, and laser sensor 110, thereby protecting the reflective member 102, lens assembly 104, image sensor 106, filter reflection layer 108, and laser sensor 110. Additionally, the entrance hole 1142 corresponding to the reflective member 102, that is, a viewfinder, is provided on a wall of the housing 114. Light can enter the reflective member 102 through the entrance hole 1142 and then be directed towards the laser sensor 110 and image sensor 106 separately. This facilitates ranging and focusing by the laser sensor 110 and enables framing and imaging by the image sensor 106.

Furthermore, a flexible cable 112 is further included, where the flexible cable 112 is provided inside the housing 114 and is electrically connected to the image sensor 106 and the laser sensor 110 separately.

The flexible cable 112 is provided inside the housing 114, so that on the one hand, images formed by the image sensor 106 and image information obtained by the laser sensor 110 can be sent to a main control board, that is, an electrical connection is formed between the image sensor 106 and the main control board, and between the laser sensor 110 and the main control board, thereby achieving rapid and automatic focusing function. On the other hand, the flexible cable 112, provided inside the housing 114, can also fix the image sensor 106 and laser sensor 110 to the housing 114, thereby ensuring the stability of the two sensors.

Furthermore, the flexible cable 112 is an FPC cable, and the two sensors can be fixed in place using the mature FPC cable connection process.

The entrance surface 1022 is perpendicular to the exit surface 1026, and light entering the reflective member 102 can be directed perpendicularly to the exit surface 1026 under the action of the reflective and transmissive surface 1024. The entrance surface 1022 is parallel to an end surface of an entrance hole 1142 in the housing 114.

For the reflective member 102, the three surfaces can form an arbitrary angle with each other. However, in this embodiment, in order to achieve better imaging, the entrance surface 1022 and the exit surface 1026 are processed to be perpendicular to each other, and the entrance surface 1022 is limited to be parallel to the end surface of the entrance hole 1142. In this way, the light enters the reflective member 102 perpendicularly through the entrance surface 1022, and when it is directed onto the image sensor 106 through the exit surface 1026, it is also limited to be directed perpendicularly to the exit surface 1026 under the action of the reflective and transmissive surface 1024. This achieves the change of the light path under the action of the reflective and transmissive surface 1024 and meets the requirements of different imaging and spatial needs.

Those skilled in the art will understand that, based on the perpendicularity between the entrance surface 1022 and the exit surface 1026, if the light directed to the exit surface 1026 is limited to be perpendicular, an angle formed between the reflective and transmissive surface 1024 and either the entrance surface 1022 or the exit surface 1026 is 45 degrees.

The lens assembly 104 includes a plurality of lenses 1042, and the optical axes of the plurality of lenses 1042 are coaxial.

In this embodiment, the lens assembly 104 includes a plurality of coaxial lenses 1042. The quantity of lenses 1042 being plural can facilitate adjustment of the imaging focal length of the image sensor under the action of a plurality of lenses 1042, so as to realize optical zooming with different magnifications. It should be understood that the types of the plurality of lenses 1042 include but are not limited to flat mirrors, concave mirrors, convex mirrors, and the like.

Figure 9:
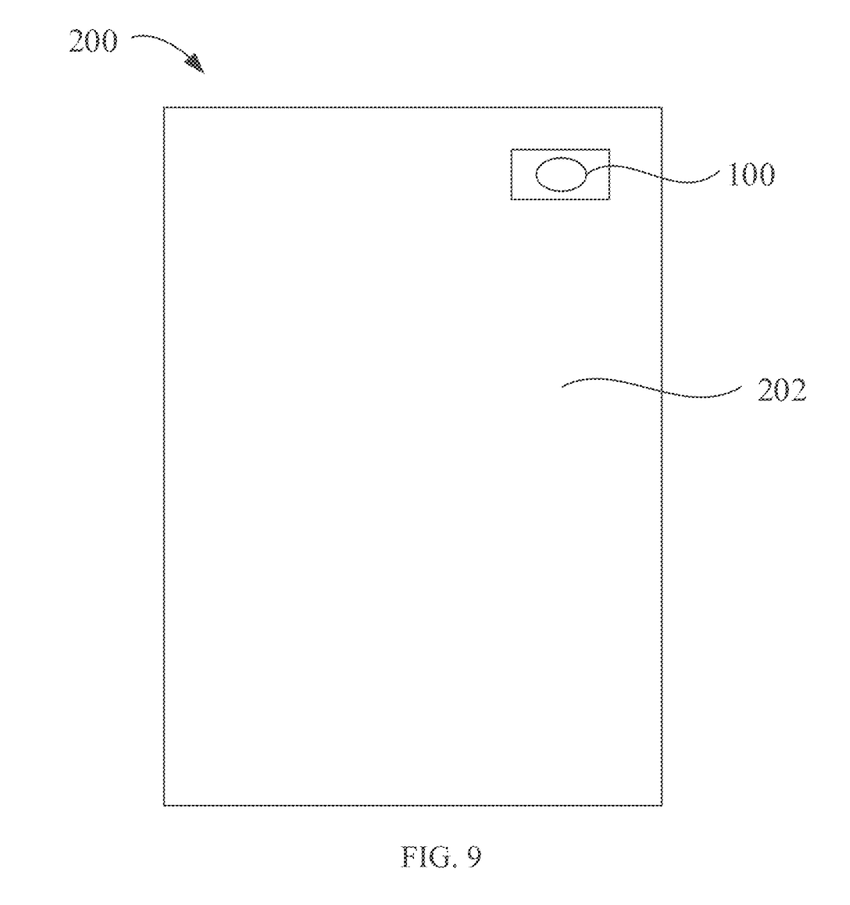
FIG. 9 is a schematic structural diagram of an electronic device according to an embodiment of this application.

Another embodiment of this application proposes an electronic device 200, including: a main body 210; and the camera module 100 according to the above embodiments, provided on the main body 210, where the camera module 100 is a front camera module and/or rear camera module of the electronic device 200.

The electronic device 200 provided according to the embodiment of this application includes the main body 210 and the camera module 100 according to any one of the above embodiments. By the provision of the camera module 100 on the main body 210, images captured by the camera module 100 can be sent to the main body 210 for further post-processing and sharing. The camera module 100 can function as a front module or rear module, thereby enabling the front or rear camera of the electronic device 200 to have an anti-shake capability, or both the front and rear cameras have the anti-shake capability according to any one of the above embodiments.

Since the electronic device 200 includes the camera module 100 in any one of the above embodiments, it has the effect of the camera module 100 in any one of the above embodiments, and details are not described herein again.

It is worth stating that the types of electronic devices 200 are diverse, such as mobile phones, tablets, e-readers, and other devices that require a camera module.

According to the camera module and electronic device in embodiments of this application, both the photosensitive unit and the focusing unit are integrated within the image sensor. The overlapping degree of the fields of view of the photosensitive units in the laser sensor and the image sensor, thereby improving the accuracy of the focus point, making it more convenient for users to focus when using the camera module for shooting.

In the description of this specification, descriptions referring to the terms "an embodiment", "some embodiments", "exemplary embodiments", "an example", "a specific example", or "some examples" mean the specific features, structures, materials or characteristics described with to the embodiment or example are included in at least one embodiment or example of this application. In this specification, illustrative expressions of these terms do not necessarily refer to the same embodiment or example. Moreover, the specific features, structures, materials, or characteristics described may be combined in any suitable manners in any one or more embodiments or examples.

Although some embodiments of this application have been illustrated and described, those of ordinary skill in the art can understand that various changes, modifications, substitutions, and variations of these embodiments may be made without departing from the principle and purpose of this application, and the scope of this application is defined by the claims and their equivalents.

What is claimed is:

1. A camera module, comprising:
   a reflective member provided with a reflective and transmissive surface;
   a lens assembly and an image sensor, provided on a side of the reflective member, wherein light directed outwardly through the reflective member is directed to the image sensor through the lens assembly;
   a filter reflection layer, provided on the reflective and transmissive surface, wherein the filter reflection layer is capable of reflecting light of a first frequency band and transmitting light of a second frequency band; and
   a laser sensor, provided on a side of the reflective and transmissive surface facing away from an entrance surface, wherein:
   projection of the filter reflection layer on an installation surface of the laser sensor overlaps with at least a part of the laser sensor, the laser sensor determines a distance based on the light of the second frequency band transmitted through the filter reflection layer, and the lens assembly adjusts a focus based on the distance,
   the first frequency band and the second frequency band are independent of each other, and
   the filter reflection layer is a dichroic filter or an interference filter optical coating.

2. The camera module according to claim 1, wherein:
   the first frequency band is an infrared frequency band,
   the second frequency band is a visible light frequency band,
   the reflective member comprises a first lens body and a second lens body,
   an exit surface of the first lens body being opposite to an entrance surface of the second lens body, and
   the filter reflection layer is provided on a reflective and transmissive surface of the second lens body,
   wherein:
   external light enters the second lens body through an entrance surface, a reflective and transmissive surface, and the exit surface of the first lens body, and then the external light is directed to the image sensor through the entrance surface, the reflective and transmissive surface, and the filter reflection layer of the second lens body; and
   the ranging light enters the first lens body through an exit surface, the reflective and transmissive surface, the filter reflection layer, and the entrance surface of the second lens body, and then the ranging light passes through the exit surface, the reflective and transmissive surface, and the entrance surface of the first lens body and is directed outwardly.

3. The camera module according to claim 1, wherein:
   the reflective member is a prism,
   the reflective member comprising an entrance surface, the reflective and transmissive surface, and an exit surface,
   wherein external light entering the reflective member through the entrance surface, is reflected by the reflective and transmissive surface, and is directed from the exit surface to the lens assembly.

4. The camera module according to claim 3, wherein the entrance surface and the exit surface are perpendicular to each other, and light entering the reflective member is able to be directed perpendicularly to the exit surface under action of the reflective and transmissive surface.

5. The camera module according to claim 1, wherein the laser sensor comprises:
   a signal emitter configured to emit ranging light outwardly, wherein the ranging light passes through the filter reflection layer and the reflective member and is directed outwardly; and
   a signal receiver configured to receive the ranging light directed into the signal receiver after the ranging light is reflected by an obstacle.

6. The camera module according to claim 1, comprising:
   a housing, wherein the reflective member, the lens assembly, the image sensor, the filter reflection layer, and the laser sensor are provided within the housing, and an entrance hole corresponding to the reflective member is provided on a wall of the housing, allowing external light to enter the reflective member through the entrance hole.

7. The camera module according to claim 6, further comprising:
a flexible cable provided inside the housing, wherein the flexible cable is electrically connected to the image sensor and the laser sensor separately.

8. The camera module according to claim 1, wherein the lens assembly comprises a plurality of lenses, and optical axes of the plurality of lenses are coaxial.

9. An electronic device, comprising:
a main body; and
the camera module provided on the main body, wherein:
the camera module is a front camera module or a rear camera module of the electronic device, and comprising:
a reflective member provided with a reflective and transmissive surface;
a lens assembly and an image sensor, provided on a side of the reflective member, wherein light directed outwardly through the reflective member is directed to the image sensor through the lens assembly;
a filter reflection layer, provided on the reflective and transmissive surface, wherein the filter reflection layer is capable of reflecting light of a first frequency band and transmitting light of a second frequency band; and
a laser sensor, provided on a side of the reflective and transmissive surface facing away from an entrance surface,
wherein:
projection of the filter reflection layer on an installation surface of the laser sensor overlaps with at least a part of the laser sensor, the laser sensor determines a distance based on the light of the second frequency band transmitted through the filter reflection layer, and the lens assembly adjusts a focus based on the distance,
the first frequency band and the second frequency band are independent of each other, and
the filter reflection layer is a dichroic filter or an interference filter optical coating.

10. The electronic device according to claim 9, wherein:
the first frequency band is an infrared frequency band,
the second frequency band is a visible light frequency band,
the reflective member comprises a first lens body and a second lens body,
an exit surface of the first lens body being opposite to an entrance surface of the second lens body, and
the filter reflection layer is provided on a reflective and transmissive surface of the second lens body,
wherein:
external light enters the second lens body through an entrance surface, a reflective and transmissive surface, and the exit surface of the first lens body, and then the external light is directed to the image sensor through the entrance surface, the reflective and transmissive surface, and the filter reflection layer of the second lens body; and
the ranging light enters the first lens body through an exit surface, the reflective and transmissive surface, the filter reflection layer, and the entrance surface of the second lens body, and then the ranging light passes through the exit surface, the reflective and transmissive surface, and the entrance surface of the first lens body and is directed outwardly.

11. The electronic device according to claim 9, wherein:
the reflective member is a prism,
the reflective member comprising an entrance surface, the reflective and transmissive surface, and an exit surface,
wherein external light entering the reflective member through the entrance surface, is reflected by the reflective and transmissive surface, and is directed from the exit surface to the lens assembly.

12. The electronic device according to claim 11, wherein the entrance surface and the exit surface are perpendicular to each other, and light entering the reflective member is able to be directed perpendicularly to the exit surface under action of the reflective and transmissive surface.

13. The electronic device according to claim 9, wherein the laser sensor comprises:
a signal emitter configured to emit ranging light outwardly, wherein the ranging light passes through the filter reflection layer and the reflective member and is directed outwardly; and
a signal receiver configured to receive the ranging light directed into the signal receiver after the ranging light is reflected by an obstacle.

14. The electronic device according to claim 9, wherein the camera module further comprises:
a housing, wherein the reflective member, the lens assembly, the image sensor, the filter reflection layer, and the laser sensor are provided within the housing, and an entrance hole corresponding to the reflective member is provided on a wall of the housing, allowing external light to enter the reflective member through the entrance hole.

15. The electronic device according to claim 14, wherein the camera module further comprises:
a flexible cable provided inside the housing, wherein the flexible cable is electrically connected to the image sensor and the laser sensor separately.

16. The electronic device according to claim 9, wherein the lens assembly comprises a plurality of lenses, and optical axes of the plurality of lenses are coaxial.

* * * * *